United States Patent [19]

Morper

[11] Patent Number: 4,559,142
[45] Date of Patent: Dec. 17, 1985

[54] SPLIT FEED FOR THE ANAEROBIC BIOLOGICAL PURIFICATION OF WASTEWATER

[75] Inventor: Manfred Morper, Gauting, Fed. Rep. of Germany

[73] Assignee: Linde Aktiengesellschaft, Wiesbaden, Fed. Rep. of Germany

[21] Appl. No.: 578,900

[22] Filed: Feb. 10, 1984

[30] Foreign Application Priority Data

Feb. 17, 1983 [DE] Fed. Rep. of Germany ....... 3305476

[51] Int. Cl.⁴ .............................................. C02F 3/28
[52] U.S. Cl. ..................... 210/607; 210/603; 210/605; 210/631; 48/197 A; 435/167; 435/801
[58] Field of Search ............... 210/603, 607, 612, 613, 210/609, 905, 180, 631, 218, 630, 605; 48/111, 48/197 A; 71/10, 11, 12; 435/167, 801

[56] References Cited

U.S. PATENT DOCUMENTS

| | | | |
|---|---|---|---|
| 2,123,387 | 7/1938 | Tark | 210/607 |
| 3,676,334 | 7/1972 | Zuckerman et al. | 210/905 |
| 4,346,000 | 8/1982 | van Drooge | 210/218 |
| 4,400,195 | 8/1983 | Rijkens | 210/613 |

FOREIGN PATENT DOCUMENTS

| | | | |
|---|---|---|---|
| 76537 | 4/1983 | European Pat. Off. | 210/631 |
| 53-128155 | 11/1978 | Japan | 210/607 |
| 54-136747 | 10/1979 | Japan | 210/603 |
| 703508 | 12/1979 | U.S.S.R. | 210/612 |

OTHER PUBLICATIONS

Lettinga Gatze et al., "Anaerobic Treatment of Sewage and Low Strength Waste Waters" found in *Anaerobic Digestion* 1981; Elsevier Biomedical Press, (pp. 277-291).

Primary Examiner—Benoit Castel
Attorney, Agent, or Firm—Millen & White

[57] ABSTRACT

In the anaerobic biological purification of wastewater containing organic substances, some of which have a low rate of metabolism in anaerobic microorganisms, e.g., undissolved and/or partly macromolecular substances, the low-rate substances are separated from the wastewater into a secondary stream, e.g., by mechanical, adsorptive or precipitating means, before introducing the mainstream of the wastewater to be purified into the reactor operated under anaerobic conditions. The low-rate substances separated in concentrated form are treated, e.g., in a separate anaerobic reactor, or in an aerobic reactor situated downstream of the anaerobic reactor.

9 Claims, 1 Drawing Figure

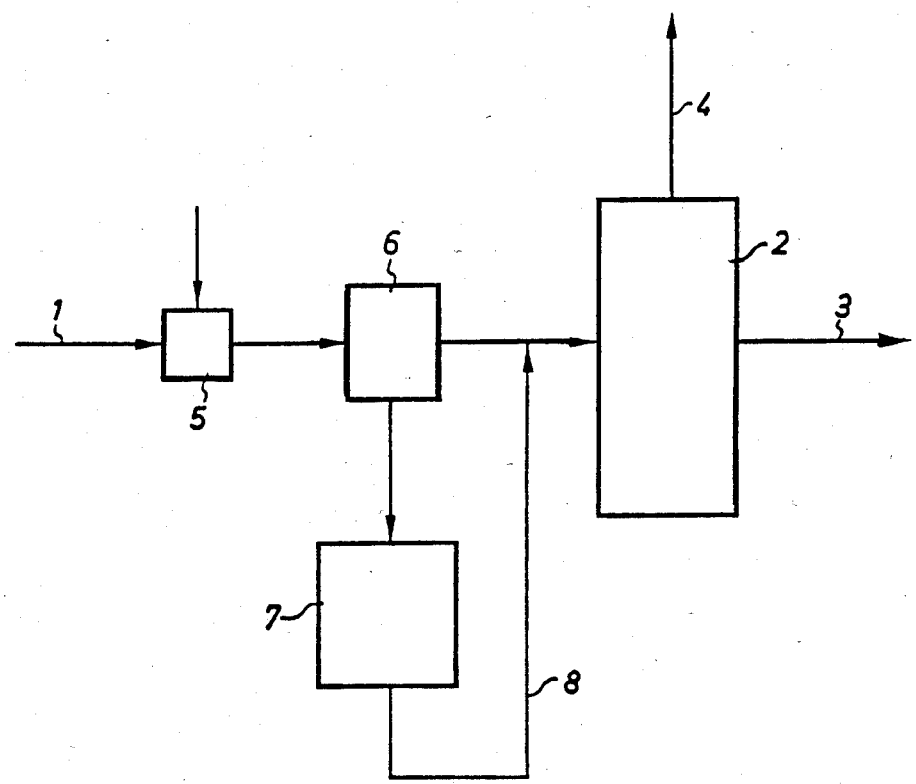

SPLIT FEED FOR THE ANAEROBIC BIOLOGICAL PURIFICATION OF WASTEWATER

BACKGROUND OF THE INVENTION

This invention relates to wastewater treatment and in particular to a process for the anaerobic biological purification of wastewater containing organic substances as well as to an apparatus for conducting the process.

As is known, organic wastewater ingredients are metabolically degraded during anaerobic wastewater purification in a succession of reaction steps to methane and carbon dioxide. (For more deails, reference is directed to "Wastewater Engineering: Treatement Disposal Reuse", Metcalf & Eddy Inc., Revised by Tchobanoglous, 2nd Edition, 1979, Boston). In this connection, the conversion of the most slowly metabolizable substances determines the total reaction period. In case of wastewaters having a complex composition, wherein part of the organic load, expressed as COD, exists in a difficult to metabolize form, such as, for example, as undissolved solids, polymers, or polycondensed aromatics, this leads frequently to long reaction times and large-volume reactors. A great variety of different anaerobic reactors are presently in use, such as, for example, complete-mix, single pass reactors, anaerobic reaction tanks with sludge recycling via a post clarification tank, upward-flow reactors with internal sludge retention, or anaerobic solid-bed reactors. Besides single-stage reactors, two-stage reactors are likewise employed with a separate acidifying and methanizing stage. For an illustration and discussion of such reactors, reference is directed to Anaerobic Digestion, Applied Science Publishers LTD, London, 1980; Anaerobic Digestion, 1981 Elsevier Biomedical Press, Amsterdam-New York-Oxford 1982.

SUMMARY

An object of this invention is to provide a process of the above-discussed type, as well as an apparatus for conducting the process, in such a way that a high purifying efficiency can be attained in a simple and economical fashion, with a saving in reactor volume or with a shortening of the residence time of the wastewater in the anaerobic reactor.

Upon further study of the specification and appended claims, further objects and advantages of this invention will become apparent to those skilled in the art.

These objects are attained according to this invention by separating the substances from the wastewater which exhibit a low rate of metabolism under anaerobic conditions into a secondary stream prior to introducing the mainstream of the wastewater to be purified into a reactor operated under anaerobic conditions. These substances in the secondary stream are treated independently of the substances which have remained in the mainstream of the wastewater to be purified and are rapidly degradable by anaerobic microorganisms.

By low-rate substances, examples thereof include, but are not limited to, partially dissolved and partially macromolecular materials, e.g., proteins, long chain fatty acids, fats, vegetable oils, tallow, bacterial and yeast cell-walls, celluloses, hemicelluloses, starch, in emulsified, suspended or colloidal state as discharged e.g. from slaughterhouses, dairies, rendering plants, oil mills, pharmaceutical and organochemical plants, pulp- and paper mills.

In general, the low-rate substances are typified by a rate of metabolism which is significantly lower than rapid rate substances. For example, acetic acid, as contained in condensates of sulfite pulping plants or glucose, as contained in sugar factory wastewaters, are rapid-rate substances, for as low molecular, polar substances they are readily dissolved in water, and the metabolic pathway to methane is short. Proteins, fats, vegetable oils etc, as contained in food producing plants, are on the other hand low rate substances, as they are of high molecular weight and/or are relatively non-polar; they are in a suspended, emulsified or colloidal state; and their metabolic pathway to methane is longer, requiring a hydrolysis and depolymerization step first. For a given organic wastewater load, e.g. expressed as COD, low rate substrates show an overall digestion rate which is typically only 5 to 30% of those found with rapid rate substrates.

By separation and segregated treatment of the low-rate metabolizable substances in a secondary stream, the objective is attained that the reaction velocity of the most slowly occurring reactions, namely the conversion of the undissolved substances by means of enzymes into dissolved substances, as well as the hydrolysis of macromolecular substances, such as polysaccharides, proteins, and fats, is no longer a determining factor for the hydraulic residence time of the wastewater in the anaerobic reactor of the mainstream. Consequently, the design volume of this anaerobic reactor can be made less than heretofore, or, alternatively, an improved COD degradation degree can be obtained, with the reactor volume remaining the same.

As for the treatment of the substances separated in the secondary stream, these are advantageously concentrated and subjected at least in part to substantially similar if not equal anaerobic conditions. Thus the low-rate substances can be converted, with the use of a small reactor volume, into dissolved compounds having a low molecular weight, such as sugars, amino acids, short chain fatty acids, or glycerol. Due to the increased concentration of the substances separated in the secondary stream, a smaller over-all reactor volume than used heretofore is sufficient for the treatment of the influent wastewater.

Advantageously, the substances anaerobically dissolved in the secondary stream are thereafter introduced into the reactor located in the mainstream and operated under anaerobic conditions. This affords the advantage of eliminating any special treatment for the further processing of these substances, and the latter contribute toward methane generation in the anaerobic reactor of the mainstream.

There is also the possibility of treating the substances separated in the secondary stream at least partially under aerobic conditions. This is expedient if only partial degradation is conducted in the mainstream anaerobic reactor with additional degradation of the main wastewater substances being conducted downstream of the anaerobic reactor in an aerobic treatment stage. The low-rate substances separated into the secondary stream upstream of the anaerobic reactor can then be fed directly to the aerobic treatment stage. It is likewise possible, as an alternative, to feed these low-rate substances into this stage only after they have been concentrated and converted, under anaerobic conditions, into dissolved substances exhibiting a low molecular weight.

The separation of the low-rate substances from the mainstream is effected advantageously with the addition of precipitants and/or flocculants and/or adsorbents by mechanical methods. Suitable additives that can be used include, but are not limited to, iron hydroxide or aluminium hydroxide as precipitants, and activated carbon, bentonite, or bleaching clay as adsorbents. For mechanical separation, for example, sedimentation, flotation, filtration, or centrifugation can be provided. Since especially macromolecular substances are particularly well suited for adsorption or precipitation, this procedure has the result that indeed essentially only the readily metabolizable substances enter into the anaerobic reactor of the mainstream. Whether precipitation, adsorption or a combination of both is chosen depends on the nature of the low-rate substances and availability of the additives. For the removal of suspended substances, precipitation will be the preferred method, using iron salts or alum as precipitants, whereas emulsified and colloidal substances will be preferably removed by adsorption, by means of activated carbon, bentonite etc.

An apparatus for conducting the process comprises at least one anaerobic reactor operated under anaerobic conditions, provided with an inlet for wastewater to be treated, an outlet for purified wastewater, as well as a gas discharge conduit for sewer gas (methane). According to the invention, such an apparatus is characterized in that the inlet for wastewater to be treated is associated with a feed means for precipitant and/or flocculant and/or adsorbent, as well as with at least one separating means for undissolved and/or flocculated and/or adsorbed substances; and that a treatment reactor for the treatment of the separated substances is connected to the separating means.

This treatment reactor can herein likewise be designed as an anaerobic reactor, but its volume can be dimensioned to be relatively small since the separated substances can be well concentrated for converting them into rapidly metabolizable substances. On the other hand, the treatment reactor can, however, also be an aerobic reactor, for example if the mainstream anaerobic reactor is followed in any case by an aerobic reactor for the further degradation of the wastewater components.

If the treatment reactor for the separated substances is a separate reactor, rather than being an already present reactor such as the aerobic reactor for the further treatment of the wastewater, then it is advantageous to connect the treatment reactor via a branch conduit to the main conduit leading into the anaerobic reactor downstream of the separating device and/or into the anaerobic reactor proper. This makes it possible to degrade the reacted substances, now present in readily metabolizable form, into methane and $CO_2$ in the mainstream anaerobic reactor, together with the substances introduced initially in readily metabolizable form.

It is furthermore advantageous to provide a carrier material for microorganisms in the treatment reactor, since in such a case a high biomass concentration can be maintained and rapid conversion can be achieved of the low-rate metabolizable substances into low molecular weight, dissolved substances. Carrier materials in this connection are, preferably macroporous materials having open macropores of 0.1–5 mm, such as, for example, foam materials, e.g., polyurethane foam, ceramics, activated carbon, or swollen clay, since such materials provide a large surface area available for settling of bacteria, the latter being able to distribute themselves uniformly and firmly fixed thereon, and being forced into decentralized growth. The carrier material can be composed of one or several blocks of such a macroporous material, provided in the reactor as fixed installations, or of individual matter particles having a diameter of 0.5–50 mm.

In the context of treating raw wastewater, the present invention is used to achieve a rapid rate anaerobic digestion of the whole wastewater stream by separating off the low-rate substances in a separately treated sidestream. Simple sedimentation or filtration of suspended matter e.g., would only be a partial solution of the waste disposal problem, as the precipitate or filtercake would have to be disposed off after a drying and stabilization step. The invention thus enables a joint treatment of rapid- and low-rate substances, without letting the low-rate wastes determine the volume of the anaerobic reactor.

BRIEF DESCRIPTION OF DRAWING

The attached figure is a schematic illustration of a preferred embodiment of an apparatus for conducting the process.

DETAILED DESCRIPTION

Wastewater to be treated is fed via an inlet 1 into an anerobic reactor 2, from which treated wastewater is discharged by way of an outlet 3, and sewer gas is removed via a gas discharge conduit 4. This anaerobic reactor can be designed as a complete-mix, single pass reactor, as an anaerobic reaction tank with sludge recycling by way of a post clarification tank, as an upward flow reactor with internal sludge retention, or as an anaerobic fixed-bed or fluidized-bed reactor. A feed means 5 for precipitant, flocculant and/or adsorbent and subsequently a separating means 6 for undissolved, flocculated and/or adsorbed substances are arranged in the inlet 1. The feed means 5 is suitably fashioned so that wastewater and additive are adequately blended together. The separating means 6 can be, for example, a sedimentation or flotation tank, a filter, or a centrifuge. The sludge removed from the separating means, containing the precipitated and/or adsorbed low-rate metabolizable substances, is conducted into a treatment reactor 7. Conversely, the liquid remaining in the separating means 6 is transferred, together with the readily metabolizable substances, into the mainstream anaerobic reactor 2 which can be designed smaller than heretofore by virtue of the separation of low-rate substances. The treatment reactor 7, which can also be designed to be relatively small in size, due to the fact that the separated substances can readily be treated in a concentrated form despite the slow rate of conversion of the solids into dissolved substances and the likewise slow rate of hydrolysis of macromolecules, is suitably operated in the same way as an anaerobic reactor. In this case, the effluent from this treatment reactor can be introduced via a bypass conduit 8 into the inlet conduit 1 to the anaerobic reactor 2 downstream of the separating means 6, or directly into the anaerobic reactor 2, without affecting the anaerobic conditions in the latter.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The numerical example set forth below is to clarify the extent of the savings in reactor volume attributable to this invention as compared with the conventional operation:

The numerical example is based on purification of a highly loaded wastewater produced in a quality of 100 m$^3$/day with a COD content of 20,000 mg/l (=2,000 kg/day). The organic load of the wastewater, expressed as COD, is to be composed of 50% readily degradable substances (=1000 kg $COD_x$/day), 40% difficult to degrade (low-rate) substances (=800 kg $COD_y$/day), and 10% nondegradable substances (=200 kg $COD_z$/day).

Degradation takes place in the individual reactors in the stationary condition of operation, which means that the microorganism populations of the various degradation stages are present in a high and constant concentration. Assuming, first order reaction kinetics for the COD degradation, the following equation results:

$$dCOD/dt = k \cdot COD; \text{ integrated:}$$
$$COD_t = COD_o/(1 + k \cdot t)$$

wherein
$COD_t$ = COD in the reactor effluent after a reaction period t (kg/d),
$COD_o$ = COD in the reactor influent (kg/d),
k = velocity constant of the first order (1/d),
t = reaction period (d).

For the readily degradable COD proportion $COD_x$, the following applies, for example: $k_x = 4(1/d)$, while for example $k_y = 0.3$ (1/d) is to be applied for the conversion of the low-rate COD proportion $COD_y$ into readily degradable $COD_x$.

The following residence time results from the aforementioned equation of the first order with the use of a conventional reactor with a throughput of the entire wastewater and assuming that 90% of the total COD is readily degradable:

$$t_x = (COD_{xo} - COD_{xt})/COD_{xt} \cdot k_x = 2.25d \text{ (wherein } COD_{xt} = COD_z).$$

Consequently, the required reactor volume for this case amounts to 225 m$^3$.

The following residence time results from the above equation for conversion of low-rate $COD_y$ into readily degradable $COD_x$:

$$t_y = [(COD_y + COD_z) - COD_{yt}]/COD_{yt} \cdot k_y = 13.3d$$

(wherein $COD_{yt} = COD_z$) corresponding to a required volume of 1,330 m$^3$ for the low-rate conversion of $COD_y$ to $COD_x$.

Using the procedure according to this invention, the low-rate COD and the COD impossible to degrade represents a 1% concentration. By precipitation-adsorption, a partial stream of, for example, 7% can be separated therefrom, corresponding to a volume of 14.3 m$^3$. With a residence time of 13.3 days for converting $COD_y$ into $COD_x$, a reactor volume is obtained of 190 m$^3$. The total reactor volume is consequently composed in this case of 190 m$^3$ for conversion of concentrated $COD_y$ into $COD_x$, as well as 225 m$^3$ for the total conversion of $COD_x$ into methane and $CO_2$, resulting in a total volume of 415 m$^3$ and, as compared with a conventional reactor, in a saving of reactor volume of 69%.

To faciliate comprehension of the above example, further information is provided as follows:

The wastewater comes from a food-canning factory, and contains easily degradable organics, e.g. acetic acid from sauerkraut production, and slowly degradable ingredients, such as vegetable debris.

The slowly degradable substances are removed from the mainstream by addition of a polymer flocculant aid and ferric chloride, with sedimentation of the formed precipitate in a sedimentation tank of conventional design. The precipitate is the above-mentioned 7% sidestream. As far as the anaerobic microorganisms are concerned, there are no specific requirements to be fulfilled. Anaerobic bacteria, as they are ubiquitous in municipal sludge digestion, e.g. are applied for start-up; those microorganisms that are best acclimated to the given substrate and reaction condition will prevail soon after start-up. In the mainstream reactor with methane production as the final metabolism step, a wide variety of microorganisms will be present in the neutral pH range (6.8-7.8), while in the side-stream reactor slightly acidic conditions (pH 5-6.5) will provide optimal conditions for hydrolyzing and acidifying bacteria, whereas methanogenic bacteria are not present.

Reactor temperatures are in the mesophilic (20°-35°C.) or thermophilic range (50°-65°C.) with temperature control by conventional cooling, heating or heat exchange.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the anaerobic biological purification of wastewater containing organic substances, a portion of the latter being metabolizable anaerobically at a low rate and being partially undissolved and partially macromolecular, the improvement comprising, prior to introducing the mainstream of the wastewater to be purified into a reactor operated under anaerobic conditions, separating at least a fraction of the low-rate metabolizable substances from the wastewater into a secondary stream; anaerobically treating said low-rate metabolizable substances independently of the remaining substances in the mainstream of the wastewater to be purified, said anaerobic treating consisting essentially of enzymatic conversion of undissolved substances into dissolved substances and hydrolysis of macromolecular weight substances into lower molecular weight substances; and introducing resultant anaerobically treated low-rate metabolizable substances into the anaerobically operated reactor located in the main stream.

2. A process according to claim 1, wherein the low-rate metabolizable substances separated in the secondary stream prior to said treating are concentrated.

3. A process according to claim 1, wherein the separation of the low-rate metabolizable substances comprises the addition of precipitants.

4. A process according to claim 3, said separation further comprising mechanically separating resultant precipitated low-rate metabolizable substances.

5. A process according to claim 1, wherein the separation of the low-rate metabolizable substances comprises the addition of flocculants.

6. A process according to claim 5, said separation further comprising mechanically separating resultant flocculated low-rate metabolizable substances.

7. A process according to claim 1, wherein the separation of the low-rate metabolizable substances comprises the addition of adsorbents.

8. A process according to claim 7, said separation further comprising mechanically separating resultant adsorbed low-rate metabolizable substances.

9. A process according to claim 1, wherein the separation of the low-rate metabolizable substances comprises mechanically separating low rate substances from the mainstream.

* * * * *